(12) United States Patent
Smith et al.

(10) Patent No.: US 9,453,550 B2
(45) Date of Patent: Sep. 27, 2016

(54) LANDING GEAR SYSTEMS HAVING SHEAR-THICKENING AND SHEAR-THINNING FLUID RESPONSES

(71) Applicant: Goodrich Corporation, Charlotte, NC (US)

(72) Inventors: Kenneth D. Smith, East Longmeadow, MA (US); Enrico Manes, Feeding Hills, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/622,261

(22) Filed: Feb. 13, 2015

(65) Prior Publication Data

US 2016/0238100 A1 Aug. 18, 2016

(51) Int. Cl.
*F16F 9/30* (2006.01)
*F16F 9/32* (2006.01)
*B64C 25/58* (2006.01)

(52) U.S. Cl.
CPC .............. *F16F 9/30* (2013.01); *B64C 25/58* (2013.01); *F16F 9/3235* (2013.01)

(58) Field of Classification Search
CPC .............. F16F 9/10; F16F 9/12; F16F 9/30; F16F 9/303; F16F 9/062; F16F 9/34; F16F 9/53; F16F 9/103; F16F 9/006; F16F 9/20; F16F 9/19; F16F 9/361; B60G 11/26; B60G 17/06; B60G 2202/24
USPC ........................................................ 188/268
See application file for complete search history.

(56) References Cited

U.S. PATENT DOCUMENTS

| | | | |
|---|---|---|---|
| 2,721,074 A * | 10/1955 | Bourcier De Carbon | F16F 9/061 188/269 |
| 2,846,028 A * | 8/1958 | Gunther | F16F 9/535 188/267.2 |
| 3,442,501 A | 5/1969 | Soderberg | |
| 3,489,087 A * | 1/1970 | Soderberg | F16F 9/512 102/277 |
| 4,452,437 A * | 6/1984 | Lochner | B60R 19/54 188/289 |
| 4,711,435 A * | 12/1987 | Harris | F16F 9/348 137/493 |
| 2002/0171067 A1 | 11/2002 | Jolly et al. | |
| 2004/0173422 A1 | 9/2004 | Deshmukh et al. | |
| 2010/0066051 A1 | 3/2010 | Haugen | |
| 2010/0221521 A1* | 9/2010 | Wagner | B01F 17/0028 428/315.5 |
| 2011/0121223 A1 | 5/2011 | Ulicny et al. | |
| 2012/0186003 A1* | 7/2012 | Heger | A41D 13/015 2/412 |
| 2014/0353938 A1* | 12/2014 | Marble | B60G 11/26 280/124.157 |

FOREIGN PATENT DOCUMENTS

TW 200920967 * 5/2009

OTHER PUBLICATIONS

Machined translation of TW-200920967.*

(Continued)

*Primary Examiner* — Robert A Siconolfi
*Assistant Examiner* — San Aung
(74) *Attorney, Agent, or Firm* — Snell & Wilmer L.L.P.

(57) ABSTRACT

A shock damper is disclosed. The shock damper may have a shear control apparatus through which a shear-thickening fluid may flow. In this manner, the shock damper may compress at different rates for different applied impulse forces, in response to the changing viscosity of the shear-thickening fluid.

20 Claims, 6 Drawing Sheets

(56) References Cited

OTHER PUBLICATIONS

Extended European Search Report dated Jul. 20, 2016 in European Application No. 16155622.0.

\* cited by examiner

LANDING GEAR SYSTEMS HAVING SHEAR-THICKENING AND SHEAR-THINNING FLUID RESPONSES

FIELD

The present disclosure relates to landing gear systems, and, more specifically, to dampers (shock absorbers) for aircraft landing gear.

BACKGROUND

Aircraft landing gear often have shock-absorbing dampers used in landing and ground operations. Conventional dampers typically use a fixed viscosity fluid that, during compression or extension, is forced through an orifice of fixed or variable size. Landing gear often absorb significant amounts of energy during landings, yet also provide firm ground handling during lower speed operations, such as taxiing. Often, however, a shock-absorbing damper that provides firm ground handling at lower speed operations is not ideal for absorbing significant energy during landings, and vice-a-versa.

The ability to control energy dissipation rates depending on loading conditions has been an active area of research over the past few decades. One of the more studied areas involves using a fluid that has a viscosity that is variable in response to a controlled magnetic field (magnetorheological fluids) or a controlled electric field (electrorheological fluids). Such fluids have shear thickening performance but are limited due to the particle size and because their use is associated with equipment for generating and sustaining electric and/or magnetic fields.

SUMMARY

In various embodiments, a shock damper is provided herein comprising shock damper comprising a cylinder, a piston housed at least partially radially within the cylinder, a shear control apparatus housed at least partially radially within the cylinder, the shear control apparatus comprising an orifice, wherein a shear-thickening fluid (STF) travels through the orifice in the shear control apparatus in response to the piston at least one of extending or compressing.

In various embodiments, a method of operating a shock damper comprising translating a piston to at least one extend or retract the piston, directing a shear-thickening fluid (STF) into an orifice in response to the translating, varying a viscosity of the STF in response to the directing, and damping the translation in response to the varying.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The present disclosure relates to landing gear components, and more particularly, to a shock damper. Aspects of the disclosure herein may be applicable to other vehicles and applications, such as an automobile shock absorber, a seat isolation damper, and/or any application of shock damping. In general, a landing gear includes a shock damper that reacts to the compression and extension impulses exerted by the variation in shock damper extension, such as those occurring during the impact of the aircraft onto the ground when landing. Particularly, helicopter landing gear undergoes a compressive event upon landing. In the event of an autorotation, or other abrupt ground impact event, the compressive event may occur more abruptly, or the acceleration to be reacted by the landing gear may be greater than typical. Thus, there is a need for a landing gear damper which can adapt to provide different degrees of damping (e.g., react with different quantities of force applied with different acceleration) over different lengths of extension/compression, in response to different impact conditions. A landing gear may be desired to react stiffly and/or compress a lesser distance for a given force over time (when a rapid impulse is applied), such as in an autorotation landing, whereas, a landing gear may be desired to react softly and to compress a greater distance for a second force over time (when a less rapid impulse is applied), such as in a typical landing wherein the loading is transferred from the rotors to the landing gear more gradually than in an autorotation landing.

Figure 2:
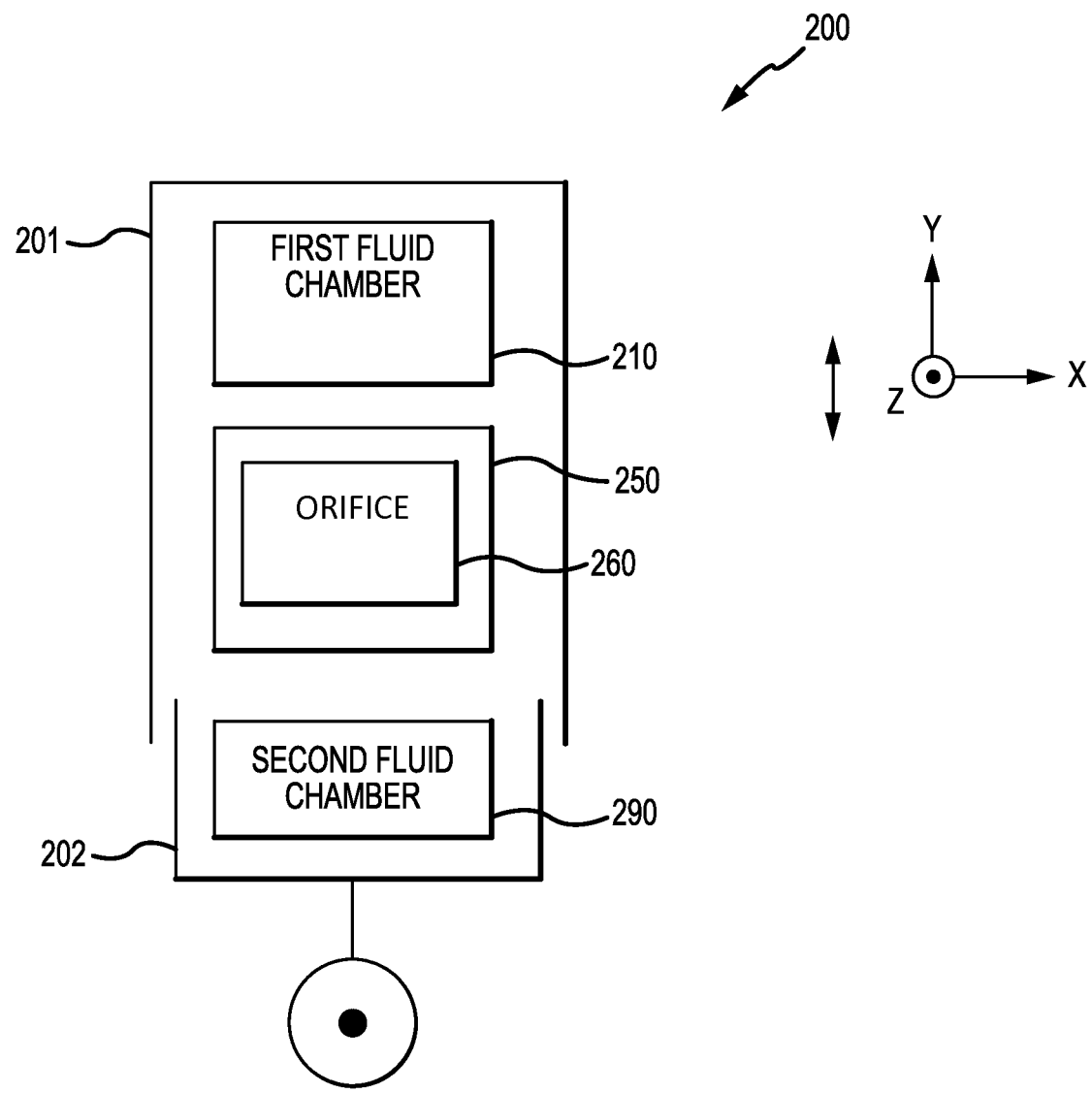
FIG. 2 illustrates a block diagram of a shear thickening damper, according to various embodiments.

In accordance with various embodiments, a shock damper 200 is shown in FIG. 2, with xyz axes shown for convenience. The shock damper 200 may be used in aerospace applications. A shear thickening fluid ("STF") may at least partially fill the shock damper 200, for example, at least partially filling the first fluid chamber 210 and/or the second fluid chamber 290.

In various embodiments, a shock damper 200 may comprise a cylinder 201 and a piston 202. The piston 202 may be configured to translate into ("instroke" in the positive y direction) and out ("outstroke" in the negative y direction) the cylinder 201 (collectively, to "stroke"). As the shock damper 200 strokes, fluid (liquid and/or gas, including a STF) is transferred among various chambers, for example, the first fluid chamber 210 and the second fluid chamber 290, traveling through the shear control apparatus 250, absorbing the energy imparted by the stroking, due to friction and viscosity of the fluid. In various embodiments, the kinetic energy input through piston 202 is also absorbed due to reaction forces resulting from the compression of a gas or spring or another mechanism for returning the piston to an unloaded position relative to the cylinder. In various embodiments, bias system 262 exerts a mechanical force that may change the volume of first fluid chamber 210. In various embodiments, bias system 262 may comprise a spring or a gas in an enclosed volume.

The piston 202 may be disposed radially inward of the cylinder 201 and may travel axially within the cylinder 201. As the piston 202 travels axially within the cylinder 201, the shock damper 200 may enter various operating regions of FIG. 1, where a fluid disposed within the shock damper 200 behaves in various ways. As FIG. 1 illustrates, in various embodiments, the relationship between compressive impulse (e.g., shear rate) and STF viscosity is nonlinear and may comprise one or more inflection points as piston 202 travels within cylinder 201 in response to different shear rates.

Figure 1:
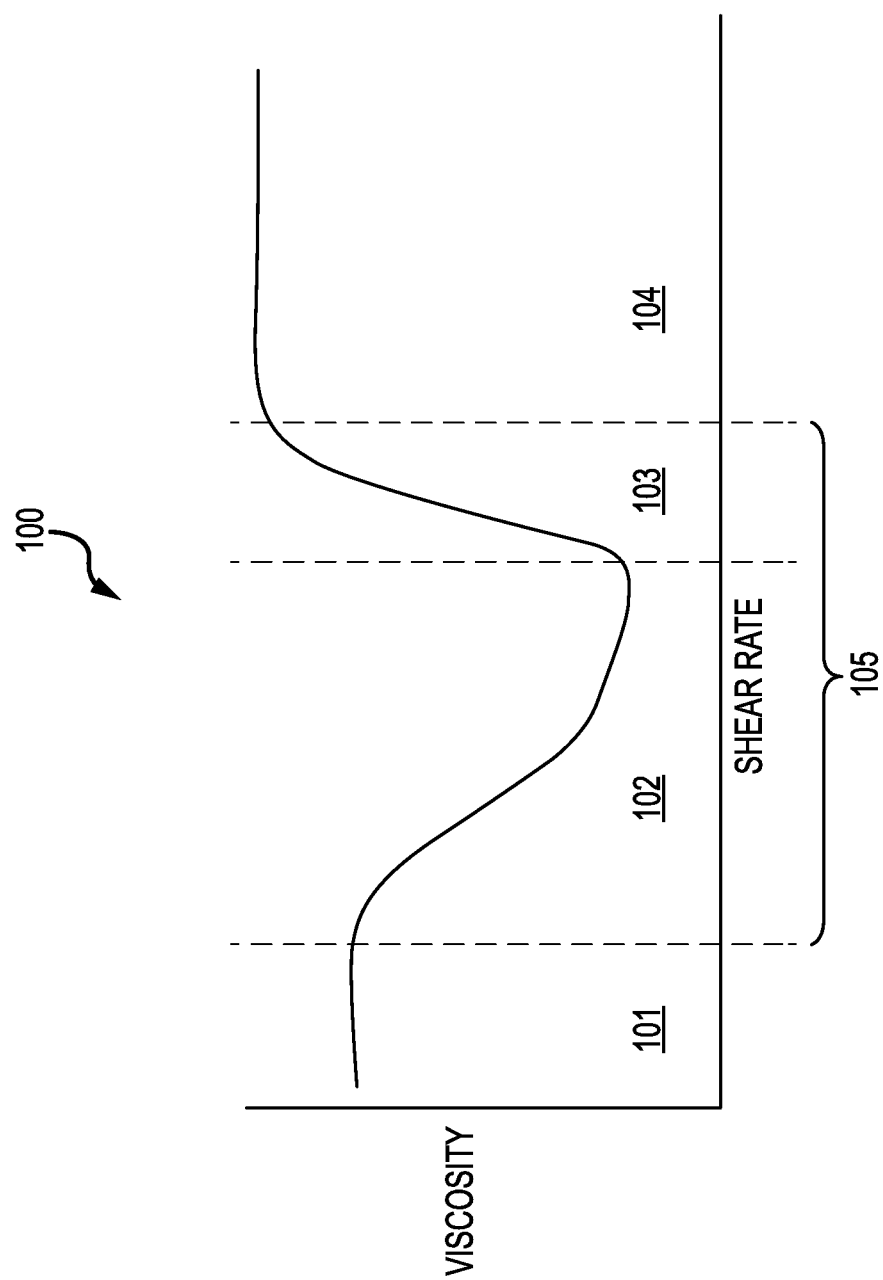
FIG. 1 illustrates a graph showing various stages of operation of a shear thickening fluid ("STF") used in a shear damper, in accordance with various embodiments.

In accordance with various embodiments, the behavior of a shear thickening fluid ("STF") is shown in FIG. 1. An STF may be a non-Newtonian fluid. An STF may comprise a liquid phase, also referred to as a carrier, and a solid phase. An STF may comprise a colloidal dispersion, for example, having the solid phase suspended in the liquid phase.

The solid phase of an STF may comprise particles of small size. The solid phase of an STF may comprise condensed polymers, oxides, and/or metals. For example, the solid phase may comprise particles ranging in size from 1 nm to 100 µm, from 10 nm to 10 µm, and from 10 nm to 1 µm. An STF may comprise one or more sizes of particle. In addition, the uniformity of particles may be substantially uniform (e.g., within 5% of a stated value such as 10 nm +/−5%), relatively uniform (e.g., within 20%-100% of a stated value), or non-uniform (e.g., within more than 100% of a stated value). In various embodiments, particles are spherical. However, ellipsoidal or needle-shaped or other particle shapes are possible and may be used with appropriate accounting for the additional effects of particle shape on the fluid properties. In various embodiments, the surface of solid phase particles may be charged, though in various embodiment the surface of solid phase particles may be electrically neutral.

The liquid phase of an STF may comprise at least one of oil (e.g., an oil commonly found used in hydraulic devices), water, gel, ionic liquids, other suitable liquids, and combinations of the same. In various embodiments containing aqueous solutions, various additives may be used to lower the freezing point of the STF to be within a desired operating temperature range. The liquid phase may comprise a pH from 1 to 14, and in various embodiments the pH of the liquid phase may be from 5 to 7. The viscosity of the STF may be a function of applied shear stress (e.g. the "viscosity curve"). The pH of a liquid phase may have an effect on the viscosity curve. The volume fraction of particles dispersed within the liquid, the particles respective average size and uniformity, and the identity of the particles and the carrier, among other things, may distinguish the viscosity curve of different STFs. Thus, in various embodiments, an STF may comprise a liquid phase of at least one of water, oil, gel, ionic liquid, dissolved acid, dissolved base, or dissolved salt and a solid phase, as described herein.

The viscosity of the STF changes in response to the applied shear stress. At rest and under weak applied shear stress, an STF may have a constant viscosity. While not desiring to be bound by theory, it is believed this is because the random distribution of particles (e.g., due to Brownian motion) causes the particles to frequently collide. However, as a greater shear stress is applied so that the shear rate increases, the particles flow in a more streamlined manner, causing viscosity to decrease. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters. This may result in a viscosity increase to a point above the resting viscosity.

The viscosity curve of the STF can be fine-tuned through changes in the characteristics of the suspended particles. For example, the particles' shape, surface chemistry, ionic strength, and size affect the various interparticle forces involved, as does the properties of the suspending medium. However, in general, hydrodynamic forces dominate at a high shear stress, which also makes the addition of a polymer brush attached to the particle surface effective in limiting clumping in hydroclusters. In various embodiments, each particle or one or more particles in a solid phase may further comprise a polymer brush, a grafted surface charge or other form of particle stabilization. Various factors influence this clumping behavior, including, fluid slip, adsorbed ions, surfactants, polymers, surface roughness, graft density (of a grafted polymer brush), molecular weight, and solvent, so that the onset of shear thickening can be tuned. In general, the onset of shear thickening can be delayed by the introduction of techniques to prevent the clumping of particles.

With reference to FIG. 1, an example viscosity curve 100 of an STF is illustrated. Shear rate is shown on the x axis and viscosity is shown on the y axis. Curve 100 illustrates that as the shear rate increases, the viscosity of an STF first travels through a nominal equilibrium region 101, then enters a microstructure transition region 105 wherein the relative dominance of hydrodynamic forces versus interparticle forces changes, and eventually, a shear-thickened equilibrium region 104 wherein hydrodynamic forces dominate over interparticle forces. In various embodiments, the shear-thickened equilibrium region 104 may comprise a greater viscosity than the nominal equilibrium region 101.

The microstructure transition region 105 comprises a shear-thinning region 102 and a shear-thickening region 103. As the particles flow in a more streamlined manner in response to the increasing shear rate, the viscosity of the STF decreases (shear-thinning region 102), until the particles begin clustering, so that the viscosity of the STF increases (shear-thickening region 103). In various embodiments of a shock damper 200, an STF is selected so that the shock damper 200 typically operates within one or more regions (nominal equilibrium region 101, shear-thinning region 102, shear-thickening region 103, and/or shear-thickened equilibrium region 104). Various embodiments are configured so that the STF operates within the shear-thinning region 102 to take advantage of the associated viscosity and also within the shear-thickening region 103 of the microstructure transition region 105, so that the damper becomes "stronger" (e.g., the viscosity of the STF increases, so that the damper can absorb more energy over a given compression distance and/or react to greater forces over a given compression distance) in response to greater shear rates (e.g., a harder landing or more rapid than typical deceleration event).

In various embodiments, an STF may have a volume fraction of the solid phase to total STF volume of from 0.01 to 0.6, from 0.2 to 0.6, from 0.18 to 0.5 and from 0.43 to 0.5. Volume fraction of the solid phase may be defined as the ratio of the volume of the solid phase to the total STF volume.

In various embodiments, an STF may comprise a liquid phase of water and a strong base (e.g. sodium hydroxide, potassium hydroxide, calcium hydroxide and the like) and a solid phase of freeze dried latex powder. Latex may comprise a styrene-ethylacrylate copolymer. Carboxyl groups may be introduced through the addition of acrylic acid and/or maleic acid.

Figure 5:
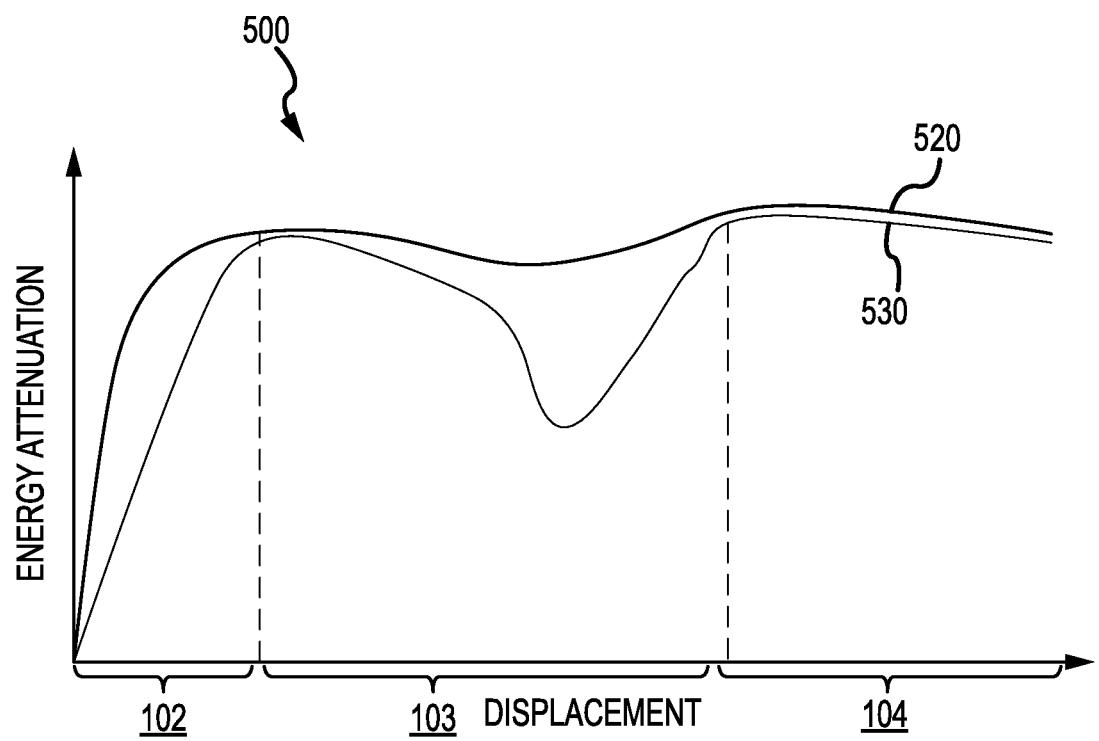
FIG. 5 illustrates a graph comparing various stages of energy attenuation between an STF-based shock damper and a conventional shock damper, in accordance with various embodiments.

With reference to FIG. 5, and with continuing reference to FIG. 1, an example energy attenuation curve 500 of an STF is illustrated. Line 520 represents the response from a shock absorber in accordance with various embodiments, while line 530 represents the response from a conventional shock absorber. Increased energy attenuation is achieved through shear thinning response during initial displacement in region 102 for the shock absorber in accordance with various embodiments relative to conventional shock absorbers. Increased energy attenuation is achieved through shear thickening response in region 103 for the shock absorber according to various embodiments relative to a conventional shock absorber. Region 104 shows improved energy attenuation response between both shock absorber configurations.

With renewed reference to FIG. 2, and continuing reference to FIG. 1, the piston 202 may translate a first distance in a given amount of time in response to a first compression impulse in the shear-thinning region 102, and may translate a second distance in a given amount of time in response to a second compression impulse in the shear-thickening region 103. The ratio of the second compression impulse to the second translation distance may be greater than the ratio of the first compression impulse to the first translation distance. Stated another way, the amount of energy reacted per unit of shock damper 200 length may vary from region to region of curve 100. For example, during sudden compression of the shock damper 200, the shock damper 200 may operate within shear-thickening region 103, so that the amount of energy absorbed per length of shock damper 200 compression may increase progressively, ameliorating the impulse loading on various landing gear components without the damper "bottoming out" or failing.

In accordance with various embodiments, a STF may be selected to improve shock dampening when used in connection with structurally simple shear control apparatuses. For example, a shock damper having a shear control apparatus that comprises a plate (e.g., a cylindrical plate) having a single orifice may benefit from use of STF that is selected to have a low viscosity in response to a first range of shear rates and a high viscosity in response to a second range of shear rate.

Figure 3:
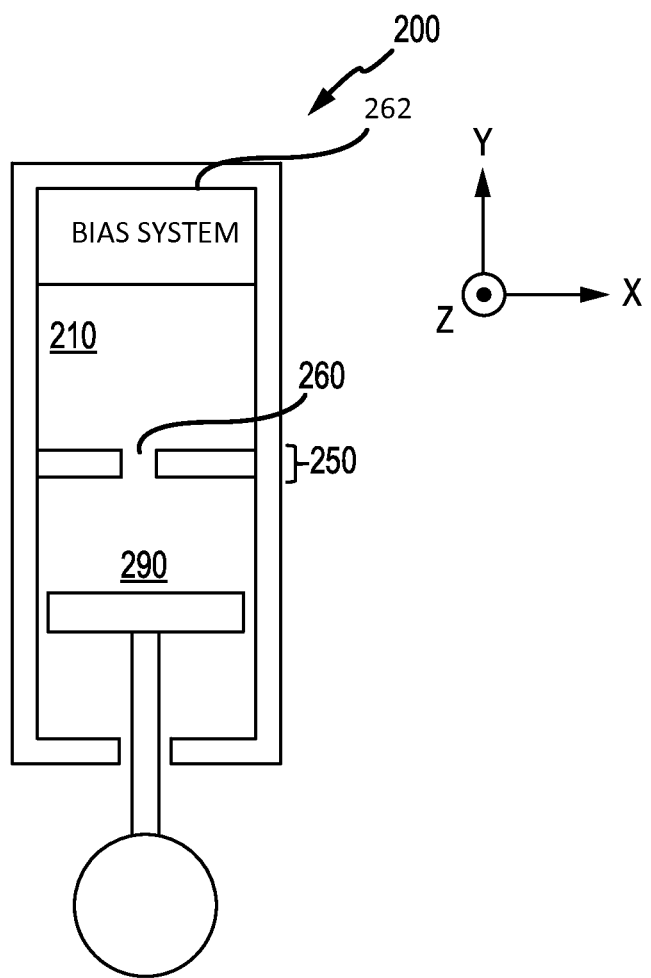
FIG. 3 illustrates a shear control apparatus of a STF damper according to various embodiments.
Figure 4A:
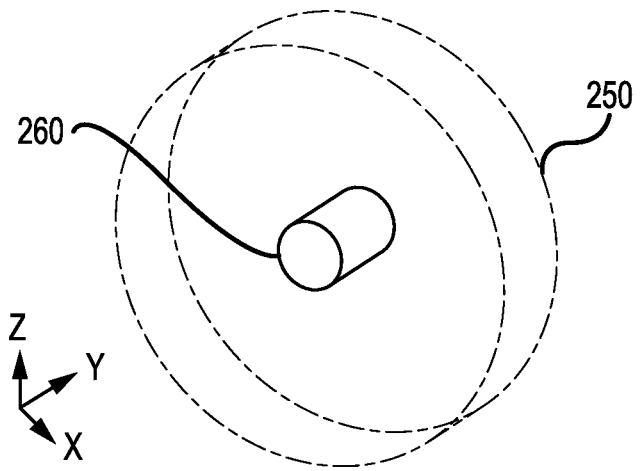
FIGS. 4A and 4B illustrate a shear control apparatus of a shear thickening damper mechanically fixed to a piston according to various embodiments.
Figure 4B:
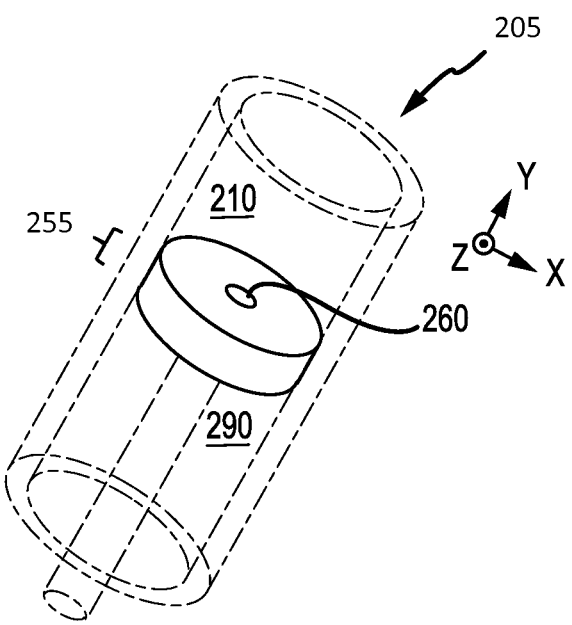

With reference to FIGS. 2, 3, 4A, the shock damper 200 may further comprise various components. For example, the shock damper 200 may comprise a first fluid chamber 210 and a shear control apparatus 250 disposed in fluid communication with the first fluid chamber 210. The shock damper 200 may comprise a second fluid chamber 290 disposed in fluid communication with the shear control apparatus 250. As previously discussed, an STF may travel between the first fluid chamber 210 and the second fluid chamber 290 through the shear control apparatus 250, and thus the fluid communication between first fluid chamber 210 and second fluid chamber 290 may be provided by shear control apparatus 250. More particularly, in various embodiments, the shear control apparatus 250 may travel axially within the cylinder 201. However, in various embodiments, the shear control apparatus 250 may be fixed to cylinder 201. Stated another way, in various embodiments, shear control apparatus 250 may be constrained from motion relative to cylinder 201. With brief reference to FIG. 4B, shock damper 205 is illustrated, which is identical to shock damper 200 except that shock damper 205 comprises shear control apparatus 255, which is configured to translate with the piston 202. With reference back to FIGS. 2, 3, 4A, as the shear control apparatus 250 travels axially within the cylinder 201, the available volume in the first fluid chamber 210 and the second fluid chamber 290 changes, depending on the position of the shear control apparatus 250 relative to cylinder 201. A fixed volume of STF may be contained within the first fluid chamber 210 and/or the second fluid chamber 290. As a result, in response to instroke of piston 202, the STF may travel through the shear control apparatus 250. Depending upon the instantaneous viscosity of the STF, which as discussed above is a function of shear rate, the STF interacts with the shear control apparatus 250 with varying degrees of frictional resistance. The force communicated from the piston 202 to the shear control apparatus 250 is reacted on the shear control apparatus 250 by the STF, damping the acceleration of the shear control apparatus 250, and thus, damping the acceleration of the piston 202.

In various embodiments, the shear control apparatus 250 may comprise a single orifice 260 (referred to also as an orifice). The single orifice 260 may be an aperture in fluid communication with the first fluid chamber 210 and the second fluid chamber 290. In that regard, single orifice 260 may comprise an opening on opposing faces of the shear control apparatus 250 and connected by a bore through shear control apparatus 250. Accordingly, single orifice 260 refers to the channel through which an STF may flow across shear control apparatus 250. An STF may travel from the second fluid chamber 290, through the single orifice 260 and into the first fluid chamber 210. In various embodiments, an STF may travel from the first fluid chamber 210, through the single orifice 260 and into the second fluid chamber 290. In further embodiments, shear control apparatus 250 may comprise multiple orifices that may conduct an STF.

The single orifice 260 may comprise an orifice diameter. A smaller orifice diameter may increase the shear rate (FIG. 1) exerted on the STF for a given impact versus a larger orifice diameter. In various embodiments, the orifice diameter is selected to cause the STF to operate primarily in the shear-thickening region (see 103; FIG. 1) under given operating conditions. In various embodiments, the orifice diameter is selected to cause the STF to operate primarily in the shear-thinning region (see 102; FIG. 1) under given operating conditions.

The single orifice 260 may comprise a bore shape. The bore shape may also be selected to affect the tendency of the STF to behave in different ways. For example, as the STF thickens, a boundary layer forms at the solid-liquid interface of various shock damper 200 components. In various embodiments, a narrow shape, such as a compressed oval, may cause a boundary layer formed at two different portions of the bore shape to intersect, thereby restricting the flow rate of STF through the single orifice 260.

Moreover, the bore length may be selected with the same considerations. Furthermore, the bore length may be selected in view of additional considerations, for example, in view of the desired surface area of the solid-liquid interface of the single orifice 260 and the STF. An bore length causing the single orifice 260 to have a greater surface area, causes the shear control apparatus 250 to experience a greater load in response to a given STF viscosity, because the single orifice 260 has more area of contact upon which to react a force.

Now, having described various components of various exemplary shock damper systems, a shock damper may be manufactured from various materials. In an exemplary embodiment, a shock damper system may comprise metal. For example, a shock damper may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of shock damper systems as disclosed herein are made of different materials or combinations of materials, and/or may comprise coatings.

In various embodiments, a shock damper may comprise multiple materials, or any material configuration suitable to enhance or reinforce the resiliency and/or support of the shock damper when subjected to wear in an aircraft operating environment or to satisfy other desired electromagnetic, chemical, or physical properties, for example radar signature, load capacity, stroke length, rigidity, or heat tolerance.

In various embodiments, while the shock dampers described herein have been described in the context of aircraft applications; however, one will appreciate in light of the present disclosure, that the shock struts described herein may be used in connection with various other vehicles, for example, cars, trucks, busses, trains, boats, and submersible vehicles, or any other vehicle or device, having a shock damper.

While various example shock dampers has been discussed herein having a piston radially within a cylinder, in various embodiments, the cylinder may not comprise a circular profile, but may instead comprise a trapezoidal profile, or a triangular profile, or may comprise any shape. Similarly, the piston may comprise any corresponding shape and may be disposed within the cylinder, for example, having a profile with a lesser perimeter length than that of the profile of the cylinder.

Figure 6:
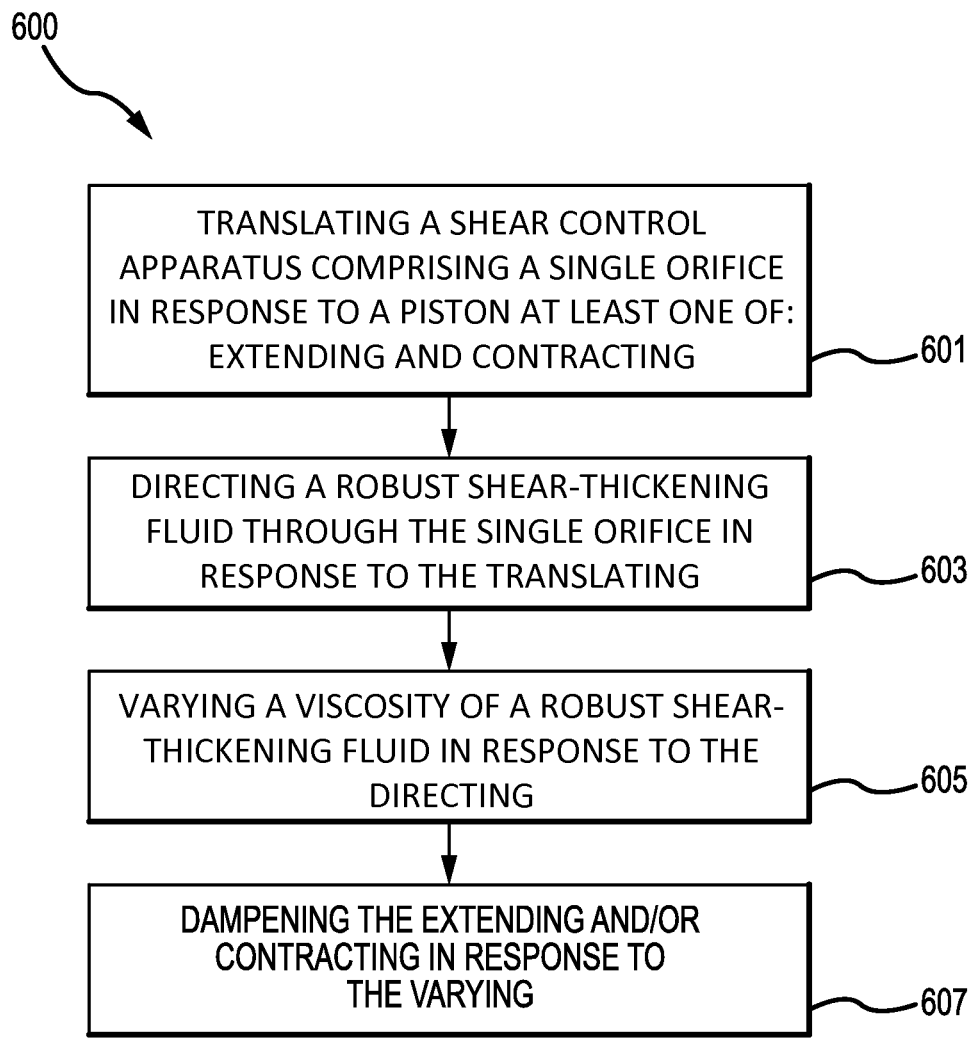
FIG. 6 illustrates an exemplary method of operating a shear thickening damper according to various embodiments.

With reference to FIGS. 2 and 6, a method 600 of operating a shock damper may be provided. The method may include translating piston 202, for example, causing piston 202 to at least one of instroke or outstroke (Step 601). A STF may be directed through the single orifice 260 in response to the translating (Step 603). In response to the directing, a viscosity of the shear-thickening fluid may be varied (Step 605). Consequently, the extending and/or contracting may be dampened in response to the varying (Step 607). In various embodiments, the shear control apparatus 250 may be non-translatable, for example, fixed to a piston (and/or cylinder) and thus, fluid may be directed through the single orifice 260 in response to translating of other system components, such as the piston (and/or cylinder) rather than the shear control apparatus 250.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention caimed is:

1. A shock damper comprising:
   a cylinder;
   a piston housed at least partially radially within the cylinder;
   a shear control apparatus housed at least partially radially within the cylinder, the shear control apparatus comprising a fixed orifice, wherein a shear-thickening fluid (STF) travels through the fixed orifice in the shear control apparatus in response to the piston at least one of extending or compressing, wherein the STF comprises a liquid phase and a solid phase, and wherein the STF is configured to have a decreasing viscosity in response to a first range of shear rates and an increasing viscosity in response to a second range of shear rates.

2. The shock damper according to claim 1, wherein the liquid phase comprises at least one of water, oil, gel, ionic liquid, dissolved acid, dissolved base, or dissolved salt.

3. The shock damper according to claim 2, wherein the solid phase comprises at least one of a latex, polymer, oxide, or metallic particles.

4. The shock damper according to claim 3, wherein the cylinder comprises a first chamber in fluid communication with the orifice and the cylinder further comprises a second chamber in fluid communication with the orifice.

5. The shock damper according to claim 2, wherein the pH of the liquid phase is from 5 to 7.

6. The shock damper according to claim 5, wherein the volume fraction of the solid phase is from 0.2 to 0.6.

7. The shock damper according to claim 1, wherein the STF is selected to operate in a shear-thinning region in response to the piston at least one of extending or compressing.

8. The shock damper according to claim 1, wherein the STF comprises a colloidal dispersion comprising:
a liquid; and
a plurality of particles, wherein each particle of the plurality of particles comprises at least one of a polymer, an oxide, or a metal suspended in the liquid, wherein a viscosity of the STF is a function of an applied shear stress.

9. The shock damper according to claim 8, wherein each particle of the plurality of particles further comprises at least one of a grafted polymer brush, a grafted surface charges or other form of particle stabilization.

10. A method of operating a shock damper comprising:
translating a piston to at least one extend or retract the piston;
directing a shear-thickening fluid (STF) into a fixed orifice in response to the translating,
the STF comprising a liquid phase and a solid phase;
varying a viscosity of the STF in response to the directing, wherein the varying comprises decreasing the viscosity of the STF and increasing the viscosity of the STF; and
damping the translation in response to the varying.

11. The method of operating the shock damper according to claim 10, wherein the a liquid phase comprises at least one of water, oil, gel, ionic liquid, dissolved acid, dissolved base, or dissolved salt.

12. The method of operating the shock damper according to claim 10, further comprising directing the STF out the fixed orifice in response to the translating.

13. The shock damper according to claim 1, wherein the second range of shear rates is greater than the first range of shear rates.

14. The shock damper according to claim 6, wherein a volume fraction of the solid phase is from 0.2 to 0.49.

15. The shock damper according to claim 7, wherein the STF is selected to operate in a shear-thickening region in response to the piston at least one of extending or compressing.

16. The shock damper according to claim 15, wherein the piston is configured to translate a first translation distance for a first duration in response to a first compression impulse in the shear-thinning region, and translates a second translation distance for a second duration in response to a second compression impulse in the shear-thickening region.

17. The shock damper according to claim 16, wherein the ratio of the second compression impulse to the second translation distance is greater than the ratio of the first compression impulse to the first translation distance.

18. The shock damper according to claim 1, wherein the solid phase comprises particles ranging in size from 10 nm to 10 µm.

19. The shock damper according to claim 18, wherein the particles are substantially uniform.

20. The method of operating the shock damper according to claim 10, wherein the translating comprises translating a first translation distance for a first duration in response to a first compression impulse in a shear-thinning region, and translating a second translation distance for a second duration in response to a second compression impulse in a shear-thickening region, wherein the ratio of the second compression impulse to the second translation distance is greater than the ratio of the first compression impulse to the first translation distance.

* * * * *